Figure 1:
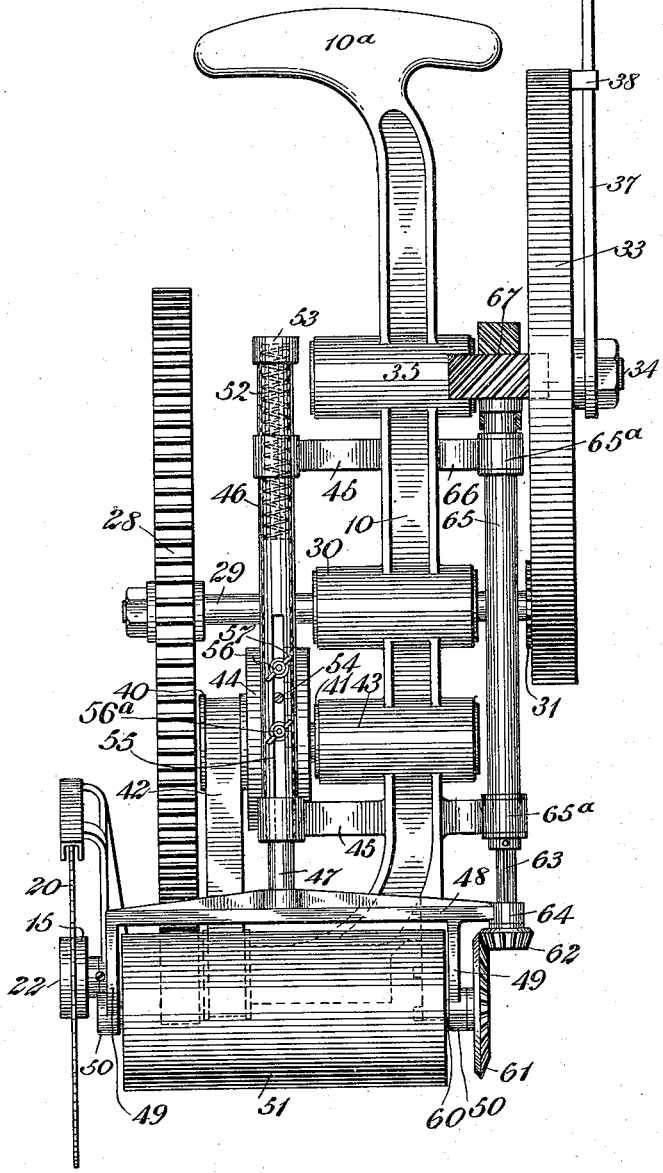

G. J. TAPPAN.
SAWING MACHINE.
APPLICATION FILED AUG. 19, 1914.

1,156,722.

Patented Oct. 12, 1915.
3 SHEETS—SHEET 1.

WITNESSES

INVENTOR
George J. Tappan
BY
ATTORNEYS

G. J. TAPPAN.
SAWING MACHINE.
APPLICATION FILED AUG. 19, 1914.

1,156,722.

Patented Oct. 12, 1915.
3 SHEETS—SHEET 2.

WITNESSES

INVENTOR
George J. Tappan
BY
ATTORNEYS

G. J. TAPPAN.
SAWING MACHINE.
APPLICATION FILED AUG. 19, 1914.
1,156,722.
Patented Oct. 12, 1915.
3 SHEETS—SHEET 3.
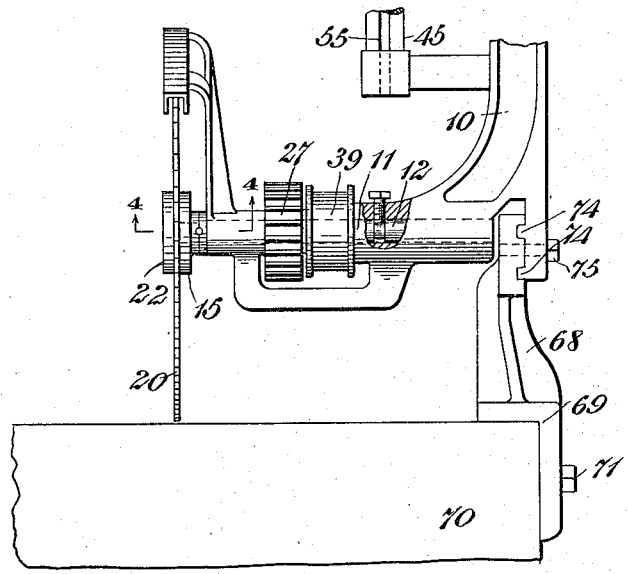
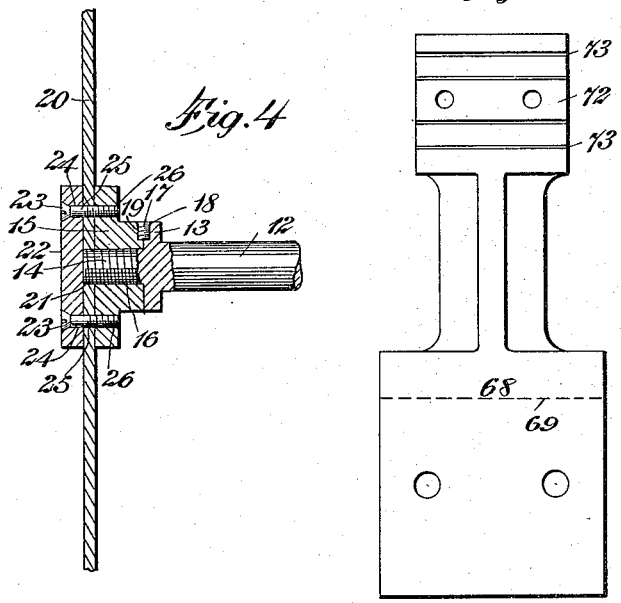
WITNESSES
INVENTOR
George J. Tappan
BY
ATTORNEYS

UNITED STATES PATENT OFFICE.

GEORGE J. TAPPAN, OF TULALIP, WASHINGTON.

SAWING-MACHINE.

1,156,722.   Specification of Letters Patent.   Patented Oct. 12, 1915.

Application filed August 19, 1914. Serial No. 857,486.

*To all whom it may concern:*

Be it known that I, GEORGE J. TAPPAN, a citizen of the United States, and a resident of Tulalip, in the county of Snohomish and State of Washington, have invented a new and Improved Sawing-Machine, of which the following is a full, clear, and exact description.

My invention has for its objects to provide a sawing machine operable by a crank which is connected by gearing with a saw, a fly-wheel being provided for maintaining the rotation of the saw at an even rate of speed. As a means for holding the saw against the wood to be cut, and to carry the machine forward, a rubber roller is mounted for rotating in a direction opposite to the direction of the rotation of the saw.

Another object of the invention is to provide a bracket by means of which the frame of the circular saw may be mounted on a work bench.

My sawing machine may be employed for a great variety of purposes but it is particularly well adapted for cutting out portions of floors and for cutting through siding and sheeting of a building when it is desired to cut an opening or build on an addition.

Still other objects of the invention will appear in the following specification in which the preferred form of my invention is disclosed.

In the drawings similar reference characters refer to similar parts in all the views in which—

Figure 2:
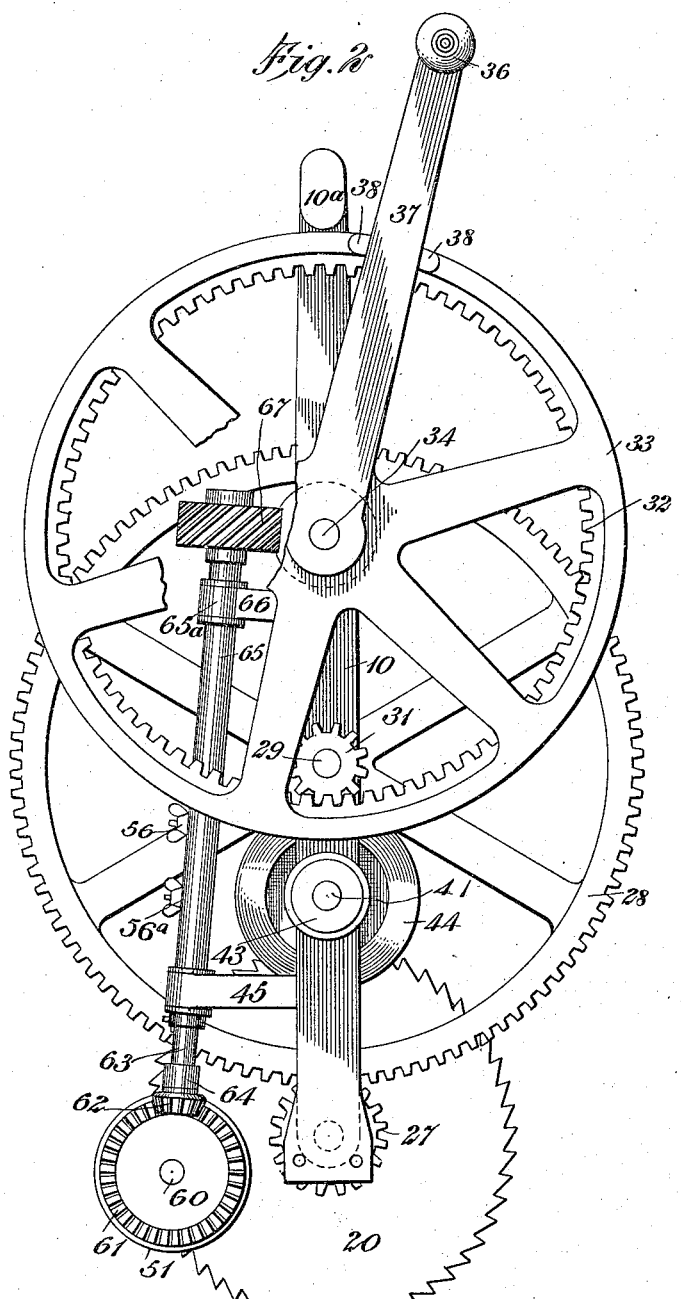

Figure 1 is a rear view of my invention; Fig. 2 is a side elevation of the invention; Fig. 3 is a fragmentary view showing how the frame of the circular saw is supported on a work bench by means of a bracket; Fig. 4 is an enlarged sectional view on the line 4—4 of Fig. 3; Fig. 5 is an enlarged fragmentary view showing the sleeve and rod provided for guiding the roller and regulating the depth the saw is to cut. Fig. 6 is an enlarged view showing the bracket which is used to support the frame of the circular saw on a work bench.

By referring to the drawings, it will be seen that a frame 10 is provided having a bearing 11 in which a shaft 12 is journaled, this shaft 12 having a collar 13 and a threaded projection 14, a member 15 having a threaded opening 16 meshing with the threaded projection 14 and being held against rotation relatively to the shaft 12 after it has been turned home and locked by means of a screw 17 meshing in threaded openings 18 and 19, the threaded opening 18 being in the collar 13 and the threaded opening 19 being in the member 15. The saw 20 has an opening 21 meshing with the end of the threaded projection 14 and at the outer side of the saw 20 there is a disk 22, screws 23 being disposed through orifices 24 in the disk 22 and meshing in the threaded orifices 25 in the saw 20 and threaded orifices 26 in the member 15. Secured to this shaft 12 for rotating therewith there is a gear wheel 27 with which meshes a gear wheel 28 mounted on a shaft 29 journaled in a bearing 30 in the frame 10, there being a second gear wheel 31 mounted on this shaft 29 which meshes with the inner teeth 32 of the wheel 33. This wheel 33 is secured to a shaft 34 journaled in a bearing 35 in the frame 10. By the means which has been described the saw 20 will be rotated with the rotation of the wheel 33 and as a means for rotating the wheel 33, I provide a handle 36 secured to an arm 37 which in turn is mounted on the shaft 34, stops 38 being provided which project from the wheel 33 and engage the arm 37 to prevent the rotation of the arm 37 relatively to the wheel 33.

As a means of maintaining the rotation of the saw 20 at an even rate of speed I provide a pulley 39 which is mounted on a shaft 12 and which is connected with a pulley 40 mounted on the shaft 41, by means of a belt 42. This shaft 41 which is journaled in the bearing 43 in the frame and between the pulley 40 and the bearing 43, is provided with a fly-wheel 44 of sufficient weight to maintain the even rotation of the shaft 41 and by means of the pulleys and the belt, which have been named the shaft 12 and the saw 20.

Mounted on the arms 45 which project from the frame 10, there is a sleeve 46 in which is disposed a rod 47, a roller frame 48 being secured to the rod 47. This roller frame 48 has depending arms 49 which are provided with bearings 50 and in which are journaled studs on a roller 51. This roller 51 is preferably constructed of rubber and is rotated in the direction opposite to the direction of the rotation of the saw 20 to engage the wood or other member to be cut, and hold it and carry the machine forward for engagement of members by the teeth of the saw. In the sleeve 46 there is a spring 52 which is seated against the head 53 with which the sleeve 46 is provided and which at its lower end engages the rod 47 to hold the roller 51 yieldingly downward and against the member to be cut. As a means for limiting the upward movement of the roller 51, I provide the rod 47 with a pin 54 movable in a slot 55 in the sleeve 46, this pin 54 being provided for engaging a stop 56 for limiting the upward movement of the pin 54, the rod 47 and the roller 51. The stop 56 is provided with wings 57 for turning the stop on a threaded member 58 which is mounted on a member disposed at the inner side of the sleeve 46 so that when the stop 56 is turned home on the threaded member 58 it will be held against the edges of the sleeve 46 at the slot 55 therein. It will be understood that when a deep cut is to be made that the stop 56 will be unscrewed and will be moved upward. On the sleeve 46 there is a scale 59 to which the operator may refer when securing the stop 56 in position when determining the depth of the cut which is to be made by the saw 20. Secured to a stud 60 which is journaled in one of the bearings 50 there is a bevel gear 61 with which meshes a beveled gear 62 mounted on a shaft 63 journaled in a bearing 64 on the roller frame 48, this shaft 63 telescoping in a hollow shaft 65 and journaled in bearings 65ª on an arm 66 of the frame 10. The shafts 63 and 65 are keyed. The shaft 34 is connected with the shaft 65 for turning the latter by a worm and worm wheel 67. It will be seen that the gearing is mounted so that when the handle 36 is rotated the saw 20 will rotate in one direction and the rubber roller 51 in the opposite direction to hold the material to be cut against the saw teeth.

When it is desired to mount the frame 10 on a work bench, the bracket 68 is employed, this bracket 68 having an angular portion 69 for engaging the top and end or side of a work bench, the bracket 68 being held to the work bench 70 by the bolts 71. At the top of the bracket 68 there is a face 72 with two horizontal grooves 73 therein, ribs 74 on the frame 10 being adapted to be disposed in the horizontal grooves 73 after which the bolts 75 may be employed for securing the frame 10 to the bracket 68. The frame 10 has a handle 10ª by which it may be held in operative position. The roller frame 48 may be removed before the frame 10 is attached to a work bench by the means described, by removing the stop 56ª, which is of the same construction as the stop 56.

Having thus described my invention, I claim as new and desire to secure by Letters Patent:

1. In a sawing machine, a frame, a saw mounted for rotating on the frame, a roller mounted on the frame for rotating on a member to be cut by the saw, a vertical shaft, gearing connecting the shaft with the roller, a horizontal shaft disposed above the roller, a worm and worm wheel connecting the two shafts, a wheel with inner gear teeth mounted on the second mentioned shaft, a third shaft having a horizontal axis and disposed between the roller and the second mentioned shaft, two gear wheels on the third shaft, one meshing with the inner gear teeth and a gear wheel mounted for rotating with the saw and meshing with the other gear wheel on the third mentioned shaft.

2. In a sawing machine, a frame, a roller mounted on the frame for rotating on a member to be cut by the saw, a vertical shaft, gearing connecting the shaft with the roller, a horizontal shaft, a worm and worm wheel connecting the two shafts, a wheel with inner gear teeth mounted on the second mentioned shaft, a third shaft having a horizontal axis and disposed between the roller and the second mentioned shaft, two gear wheels on the third shaft, one meshing with the inner gear teeth, a fourth shaft, a saw mounted on the fourth shaft, a gear wheel on the fourth shaft and meshing with the other gear wheel on the third mentioned shaft, a pulley on the fourth shaft, a fifth shaft disposed above the fourth shaft, a pulley on the fifth shaft, a belt connecting the pulleys, and a fly-wheel affixed for rotating with the fifth mentioned shaft.

3. In a sawing machine, a frame having a sleeve, a saw mounted for rotating on the frame, a rod extending in the sleeve, resilient means for holding the rod extended, a roller frame secured to the rod, a roller rotatably mounted in the roller frame and means for rotating the saw and the roller.

4. In a sawing machine, a frame having a sleeve, a saw mounted for rotating on the frame, a rod extending into the sleeve, resilient means for holding the rod extended, a roller frame secured to the rod, a roller mounted for rotating on the roller frame, a bearing on the roller frame, a shaft journaled in the bearing, gearing connecting the shaft and the roller, a bearing in the first mentioned frame, a shaft journaled in the last mentioned bearing and telescoping with the first mentioned shaft and means for rotating the second mentioned shaft and the saw.

In testimony whereof I have signed my name to this specification in the presence of the two subscribing witnesses.

GEORGE J. TAPPAN.

Witnesses:
 FRANK A. TAYLOR,
 JAMES A. O'NEIL.

Copies of this patent may be obtained for five cents each, by addressing the "Commissioner of Patents, Washington, D. C."